(12) United States Patent
Meggiolan

(10) Patent No.: US 8,616,084 B2
(45) Date of Patent: Dec. 31, 2013

(54) BICYCLE CRANK ARM ASSEMBLY

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 1163 days.

(21) Appl. No.: 11/743,434

(22) Filed: May 2, 2007

(65) Prior Publication Data

US 2007/0283781 A1 Dec. 13, 2007

(30) Foreign Application Priority Data

May 4, 2006 (IT) .............................. MI2006A0876
Apr. 24, 2007 (EP) ..................................... 07008299

(51) Int. Cl.
*B62M 3/00* (2006.01)

(52) U.S. Cl.
USPC .......................................... 74/594.1; 403/268

(58) Field of Classification Search
USPC ........................ 74/594.1–594.3; 403/265–268
See application file for complete search history.

(56) References Cited

U.S. PATENT DOCUMENTS

| | | |
|---|---|---|
| 529,110 A | 11/1894 | Copeland |
| 535,706 A | 3/1895 | Luther |
| 590,695 A | 9/1897 | Alcorn |
| 593,562 A | 11/1897 | Brennan |
| 594,109 A | 11/1897 | Weed et al. |
| 596,846 A | 1/1898 | Brown |
| 602,049 A | 4/1898 | Beard |
| 648,077 A | 4/1900 | Ludlow |
| 658,624 A | 9/1900 | Egger |
| 846,239 A | 3/1907 | Osborne |
| 951,137 A | 3/1910 | Lowrance |
| 1,235,530 A | 7/1917 | Jones |
| 1,449,235 A | 3/1923 | Lewis |
| 2,136,125 A | 11/1938 | Delaval-Crow |
| 3,306,101 A | 2/1967 | Holderer |
| 3,347,112 A | 10/1967 | Thun |

(Continued)

FOREIGN PATENT DOCUMENTS

| | | |
|---|---|---|
| CN | 1522929 | 8/2004 |
| DE | 012 57 613 | 12/1967 |

(Continued)

OTHER PUBLICATIONS

"A Folding MWB Two-Wheeled Recumbent", Nick Abercrombie Andrews. Human Power, spring-summer 1994, 11(2), pp. 18-21.

(Continued)

*Primary Examiner* — Troy Chambers
*Assistant Examiner* — Terence Boes
(74) *Attorney, Agent, or Firm* — Volpe and Koenig, P.C.

(57) ABSTRACT

A bicycle crank arm assembly is provided having at least one axle portion, a crank arm mounted on the at least one axle portion, the crank arm having a coupling seat and the axle portion a coupling portion coupled to the coupling seat, the coupling seat and the coupling portion being shaped so as to make a shape coupling to ensure that the crank arm can transmit a torque to the axle portion. Between the crank arm and the axle portion adhesive material is applied. The shape coupling ensures that the crank arm and the axle portion are integral in rotation, whereas the gluing ensures the sealing of the coupling area against corrosion phenomena. The gluing also ensures a predetermined minimum force limit necessary to disassemble the crank arm assembly. The crank arm assembly has a low overall weight, a simple assembly process, and a suitable resistance to disassembling.

18 Claims, 10 Drawing Sheets

(56) References Cited

U.S. PATENT DOCUMENTS

| | | |
|---|---|---|
| 3,578,829 A | 5/1971 | Hata et al. |
| 3,888,136 A | 6/1975 | Lapeyre |
| 3,906,811 A | 9/1975 | Thun |
| 4,093,325 A | 6/1978 | Troccaz |
| 4,208,763 A | 6/1980 | Schroder |
| 4,300,411 A | 11/1981 | Segawa |
| 4,331,043 A | 5/1982 | Shimano |
| 4,406,504 A | 9/1983 | Coenen et al. |
| 4,704,919 A | 11/1987 | Durham |
| 4,810,040 A | 3/1989 | Chi |
| 5,067,370 A | 11/1991 | Lemmens |
| 5,243,879 A | 9/1993 | Nagano |
| 5,493,937 A | 2/1996 | Edwards |
| 5,624,519 A | 4/1997 | Nelson et al. |
| 5,819,600 A | 10/1998 | Yamanaka |
| 5,907,980 A | 6/1999 | Yamanaka |
| 5,984,528 A | 11/1999 | Ohtsu |
| 6,014,913 A | 1/2000 | Masahiro |
| 6,116,114 A | 9/2000 | Edwards |
| 6,192,300 B1 | 2/2001 | Watarai et al. |
| 6,443,033 B1 | 9/2002 | Brummer et al. |
| 6,564,675 B1 | 5/2003 | Jiang |
| 6,581,494 B2 | 6/2003 | Sechler |
| 6,790,535 B2 | 9/2004 | Nishimura et al. |
| 6,829,965 B1 | 12/2004 | Mombrinie |
| 6,886,676 B2 | 5/2005 | Von Levern et al. |
| 6,938,516 B2 | 9/2005 | Yamanaka |
| 6,983,672 B2 | 1/2006 | Smith |
| 7,258,041 B2 | 8/2007 | Yamanaka et al. |
| 7,267,030 B2 | 9/2007 | French |
| 7,503,239 B2 | 3/2009 | Yamanaka |
| 7,798,724 B2 | 9/2010 | Van De Sanden et al. |
| 2001/0015390 A1 | 8/2001 | Hitomi et al. |
| 2002/0081052 A1 | 6/2002 | Chi |
| 2002/0096015 A1 | 7/2002 | Smith |
| 2003/0006113 A1 | 1/2003 | Terada et al. |
| 2003/0097901 A1 | 5/2003 | Yamanaka |
| 2004/0162172 A1* | 8/2004 | Yamanaka et al. ............ 474/160 |
| 2004/0200314 A1 | 10/2004 | Hermansen et al. |
| 2005/0011304 A1 | 1/2005 | Chiang |
| 2005/0016323 A1* | 1/2005 | Dal Pra' .................. 74/594.1 |
| 2005/0040699 A1 | 2/2005 | Chiang et al. |
| 2005/0081678 A1 | 4/2005 | Smith et al. |
| 2005/0116438 A1 | 6/2005 | Wang |
| 2005/0217417 A1* | 10/2005 | Uchida et al. ............. 74/594.1 |
| 2006/0103106 A1 | 5/2006 | Schlanger |
| 2006/0112780 A1 | 6/2006 | Shiraishi et al. |
| 2006/0288819 A1 | 12/2006 | Dal Pra' et al. |
| 2007/0137426 A1 | 6/2007 | Meggiolan et al. |
| 2007/0151410 A1 | 7/2007 | Meggiolan |
| 2007/0204722 A1 | 9/2007 | Dal Pra |
| 2007/0207631 A1 | 9/2007 | Meggiolan et al. |
| 2007/0283781 A1 | 12/2007 | Meggiolan |
| 2008/0124018 A1 | 5/2008 | Tanke et al. |
| 2009/0145262 A1 | 6/2009 | Pasqua et al. |
| 2009/0261553 A1 | 10/2009 | Meggiolan |
| 2011/0049834 A1 | 3/2011 | Natu |

FOREIGN PATENT DOCUMENTS

| | | |
|---|---|---|
| DE | 023 59 437 | 6/1975 |
| DE | 297 15 373 U1 | 8/1998 |
| DE | 200 03 398 | 5/2000 |
| EP | 0 756 991 A2 | 8/1996 |
| EP | 0 924 318 | 6/1999 |
| EP | 1 120 336 | 8/2001 |
| EP | 0916571 B1 | 10/2002 |
| EP | 1314902 A1 | 5/2003 |
| EP | 1 342 656 A2 | 9/2003 |
| EP | 1 342 656 A3 | 9/2003 |
| EP | 1 449 760 A2 | 8/2004 |
| EP | 1442974 A3 | 5/2005 |
| EP | 1 659 057 | 5/2006 |
| EP | 1 659 057 A2 | 5/2006 |
| EP | 1 661 803 | 5/2006 |
| EP | 1 726 517 | 11/2006 |
| EP | 1 726 517 A1 | 11/2006 |
| EP | 1 726 518 | 11/2006 |
| EP | 1 759 981 A2 | 3/2007 |
| EP | 1 759 981 A3 | 3/2007 |
| EP | 1 792 818 | 6/2007 |
| EP | 1 792 821 | 6/2007 |
| EP | 1 820 726 | 8/2007 |
| FR | 0 623 094 | 6/1927 |
| FR | 0 863 610 | 4/1941 |
| FR | 0 934 104 | 5/1948 |
| FR | 2 801 863 | 6/2001 |
| FR | 2 870 508 | 11/2005 |
| GB | 2315776 | 2/1998 |
| JP | 57-128585 | 8/1982 |
| JP | 05319349 | 12/1993 |
| JP | 09104383 A | 4/1997 |
| JP | 11225633 | 8/1999 |
| JP | 2000289677 A | 10/2000 |
| JP | 2003261087 A | 9/2003 |
| JP | 2004106838 A | 4/2004 |
| JP | 2004-249770 A | 9/2004 |
| JP | 2004249770 A | 9/2004 |
| JP | 2004-275193 | 10/2004 |
| JP | 2005-001663 | 1/2005 |
| JP | 2005-053410 | 3/2005 |
| JP | 2005-161984 A2 | 6/2005 |
| TW | 236991 | 12/1994 |
| TW | 200413217 A | 8/2004 |
| TW | 200502132 A | 1/2005 |
| WO | 01/63134 | 8/2001 |
| WO | 02/32751 A2 | 4/2002 |
| WO | 2005-009832 | 2/2005 |
| WO | 2005-009832 A | 2/2005 |
| WO | 2005/058682 | 6/2005 |
| WO | 2005/058682 A2 | 6/2005 |

OTHER PUBLICATIONS http://web.archive.org/web/20050210021901/http://pardo.net/bike/pic/fail-005/000.html.

English translation of Oct. 27, 2010 Office Action issued in corresponding Chinese Appln. No. 20070085427.6.

European Search Report (EP08425259), Oct. 21, 2008.

ISIS Drive Standard Committee, (Copyright 2001), *The International Spline Interface Standard*, (18 pgs.).

Japanese Office Action and English translation for Application No. 2007-118028—Issued on Nov. 6, 2012.

Japanese Office Action with English translation for Application No. 2007-037411—Issued on Feb. 28, 2012.

Japanese Office Action and English translation for Application No. 2007-118028—Issued on Feb. 28, 2012.

Taiwanese Office Action and Search Report for Application No. TW 096115774—Issued on Feb. 19, 2013 (English translation).

Japanese Office Action and English translation for Application No. 2007-037411—Issued on Feb. 28, 2012.

* cited by examiner

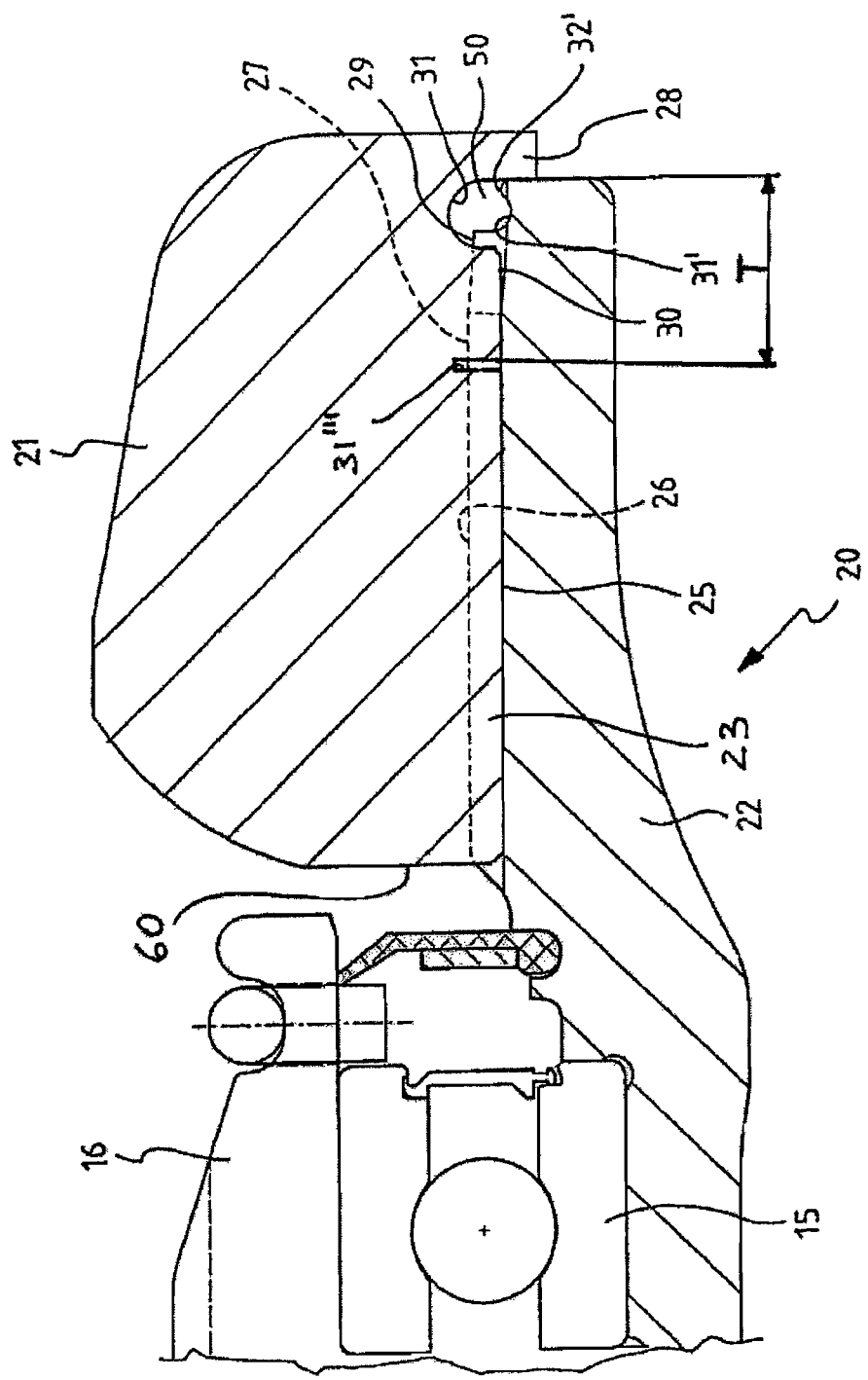

BICYCLE CRANK ARM ASSEMBLY

FIELD OF INVENTION

The invention concerns a bicycle crank arm assembly, i.e., an assembly of components of a bottom bracket assembly of a bicycle transmission that comprises a crank arm and at least one central axle portion on which the crank arm is mounted. The invention also concerns a method for assembling such an assembly.

BACKGROUND

The coupling between the ends of the central axle and a crank arm of the bicycle is typically, according to the prior art, a shape coupling, normally carried out through a grooved or polygonal profile, formed both on the aforementioned ends, and in suitable housing seats made at the ends of the elongated body of which each of the two crank arms of the bicycle consists. A fastening screw or other analogous element also ensures the attachment between the axle and the crank arm, avoiding the crank arm being able to slip off from the axle.

By their nature, shape coupling and attachment through screws have a degree of imprecision that allows small relative displacements between the crank arm and the axle.

SUMMARY

According to a first aspect of the invention, the bicycle crank arm assembly comprises at least one axle portion, a crank arm mounted on the at least one axle portion, the crank arm having a coupling seat and the axle portion having a coupling portion coupled to the coupling seat, the coupling seat and the coupling portion being shaped so as to make a shape coupling to ensure that the crank arm can transmit a torque to the axle portion, wherein between the crank arm and the axle portion adhesive material is applied.

According to a second aspect of the invention, more specifically, the method for assembling a crank arm to an axle portion of a bottom bracket assembly of a bicycle transmission comprises the shape coupling between the crank arm and the axle portion, to ensure that the crank arm can transmit a torque to the axle portion, wherein between the crank arm and the axle portion adhesive material is applied.

BRIEF DESCRIPTION OF THE DRAWING(S)

Further characteristics and advantages of the present invention shall become clearer from the following detailed description of some preferred embodiments thereof, made with reference to the enclosed drawings. In such drawings, FIG. 1 is a section view in the axial sense of a bottom bracket assembly of a bicycle transmission that incorporates crank arm assemblies according to the invention;

Figure 1:
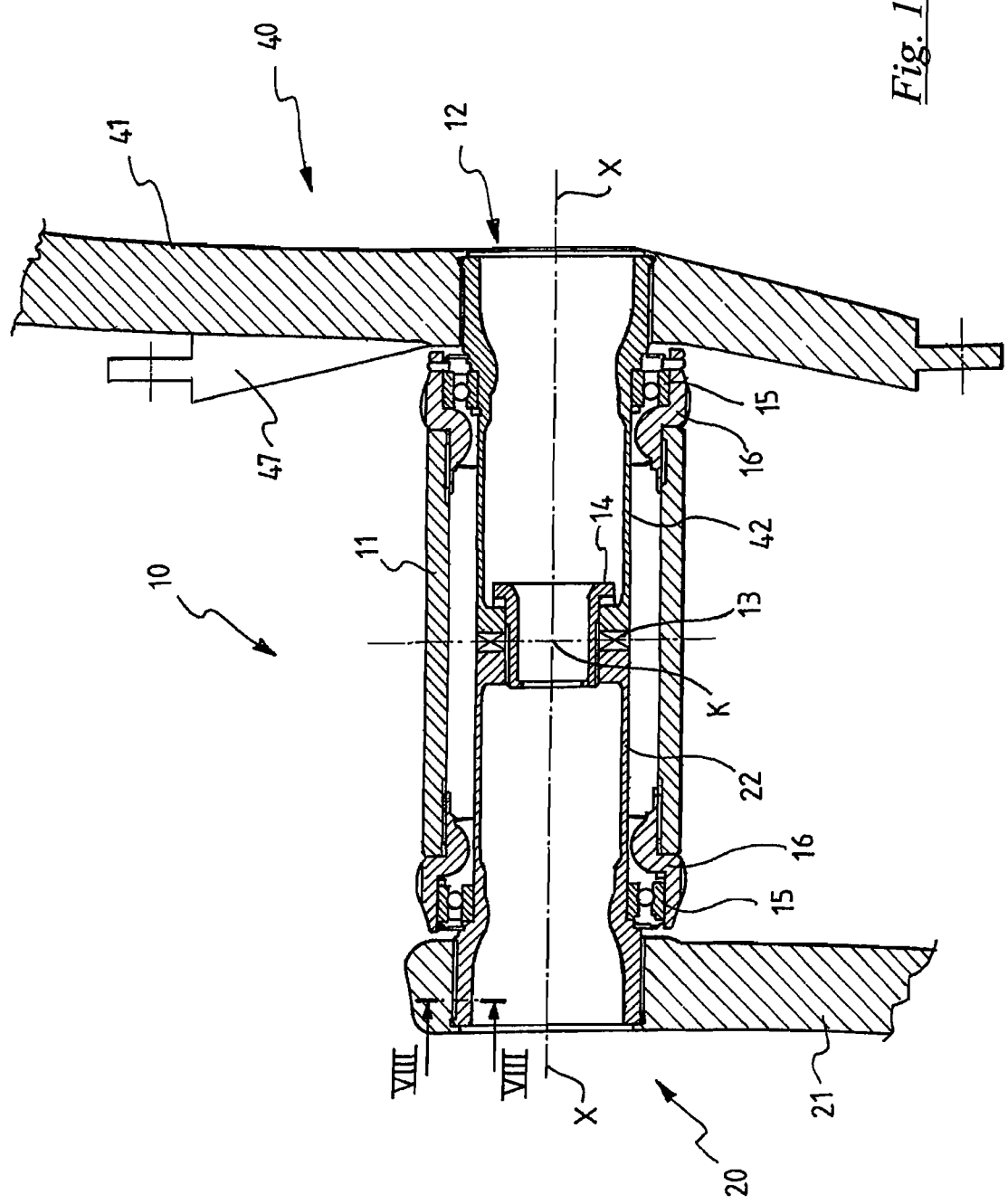
Figure 2:
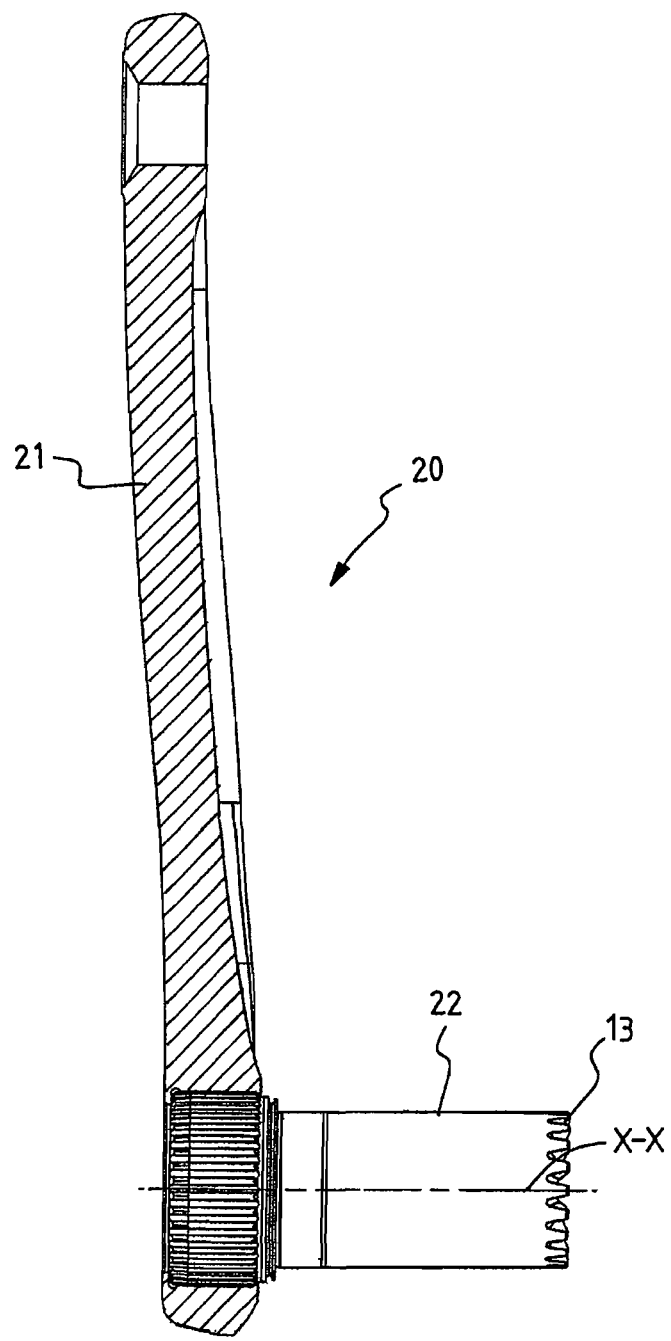
FIG. 2 is a section view in the axial sense of the left crank arm assembly of FIG. 1.
Figure 5:
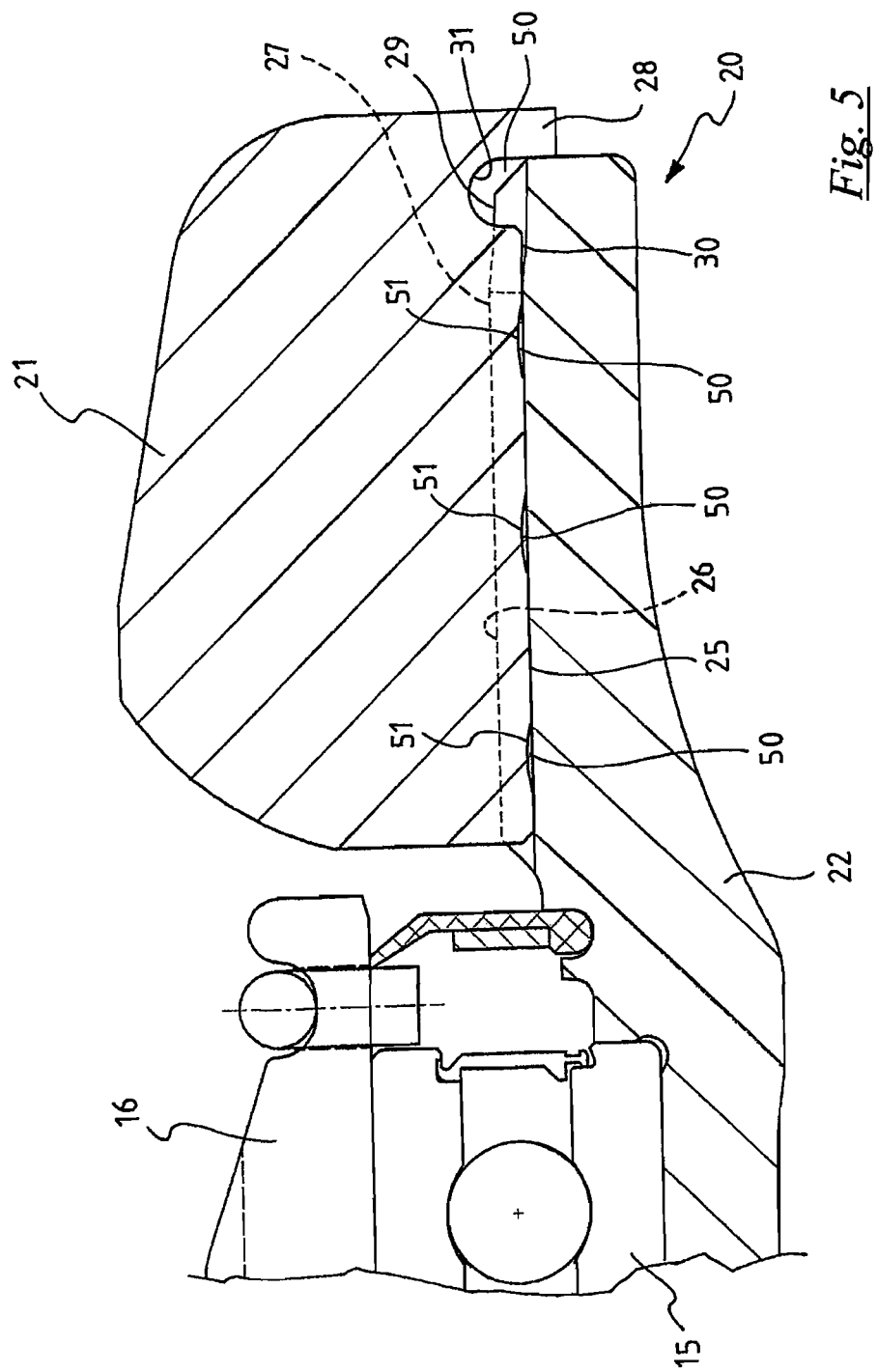
FIG. 5 is an enlarged section view in the axial sense of a detail of the crank arm assembly of FIG. 2.
Figure 6:
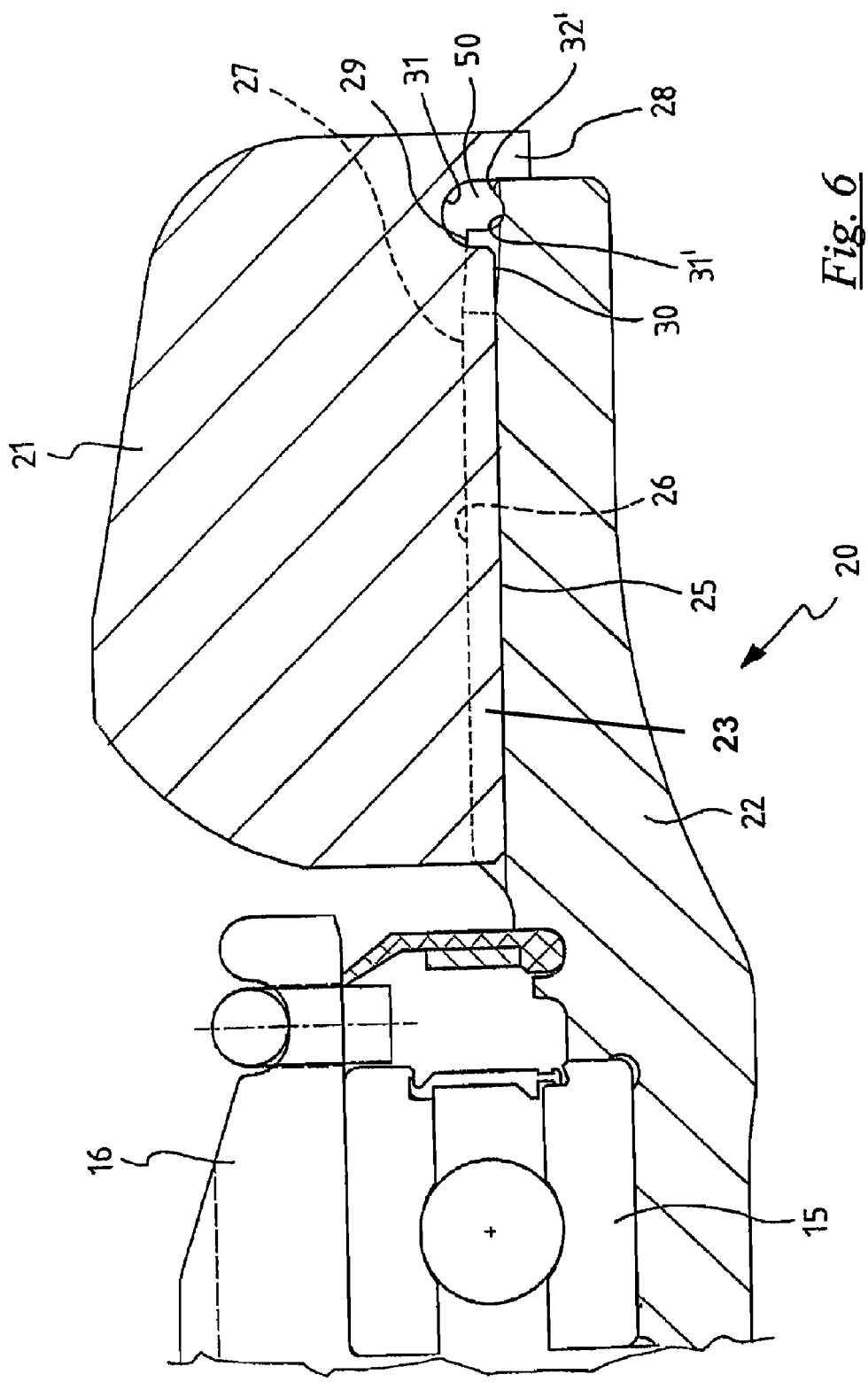
Figure 7:
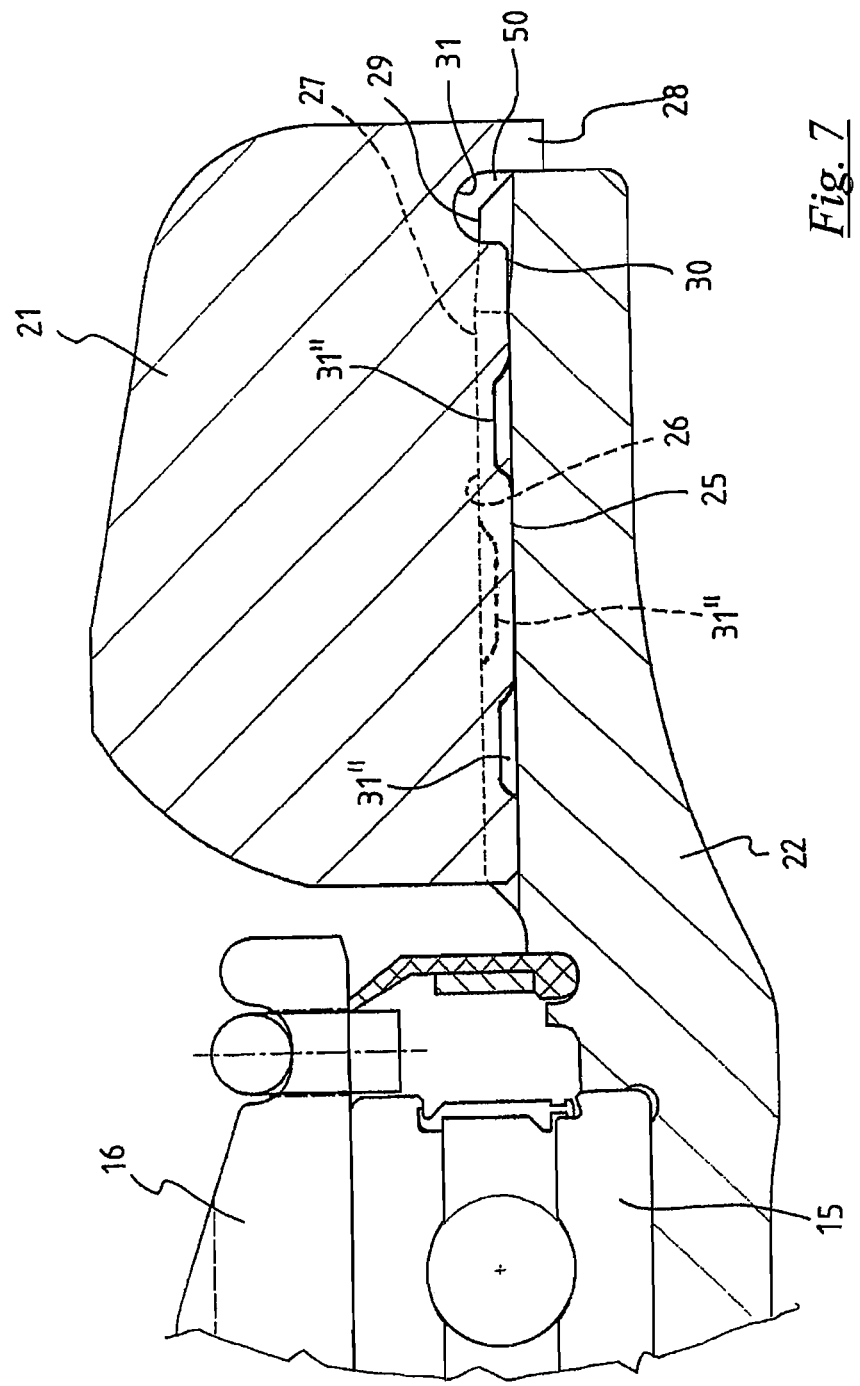
Figure 8:
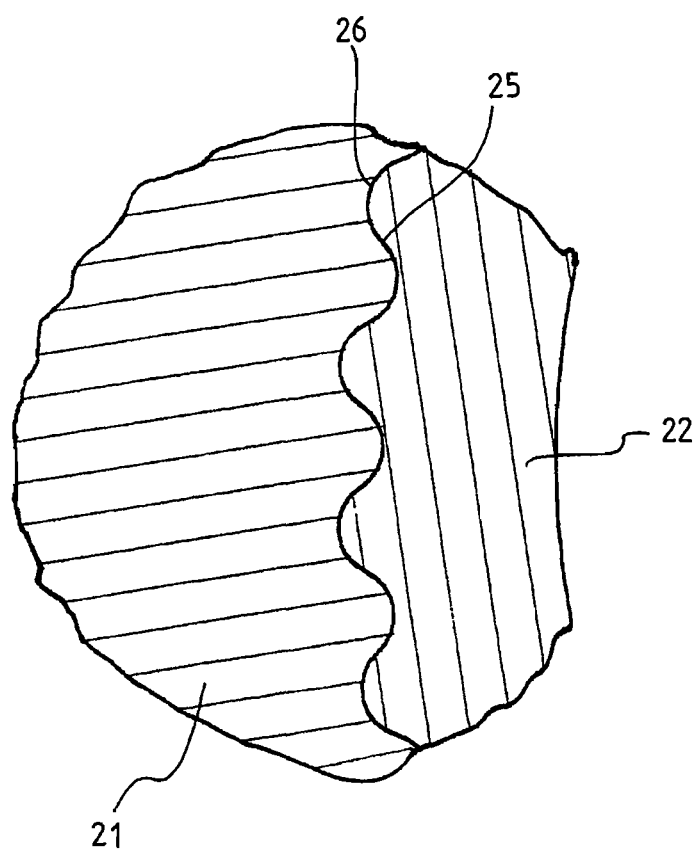
Figure 9:
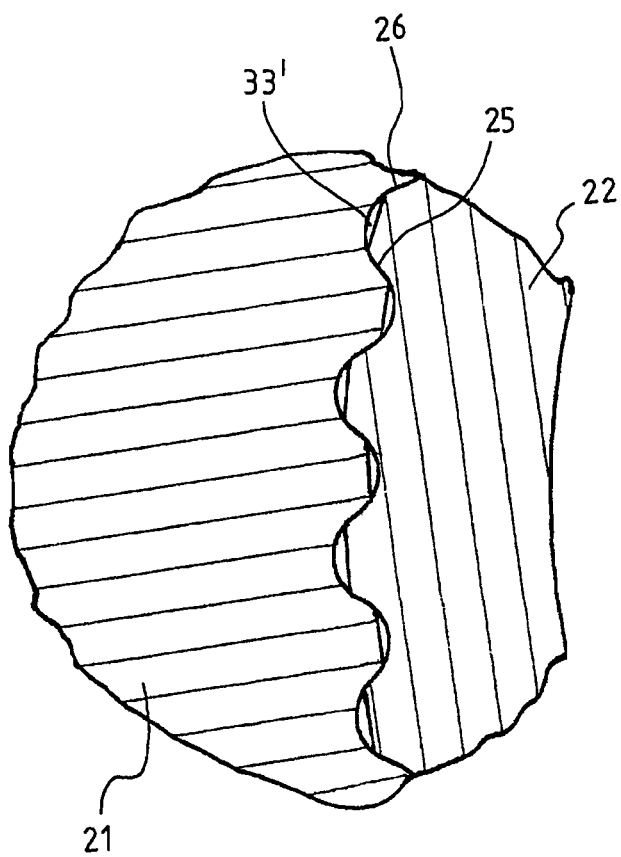

FIGS. 6, 7, and 10 are section views similar to that of FIG. 5, referring to different embodiments;

FIG. 8 is a transversal section view along the line VIII-VIII of a detail of the assembly of FIG. 1; and FIG. 9 is a section view similar to that of FIG. 8, referring to a different embodiment.

DETAILED DESCRIPTION OF THE PREFERRED EMBODIMENT(S)

Introduction

The invention concerns a bicycle crank arm assembly, i.e., an assembly of components of a bottom bracket assembly of a bicycle transmission that comprises a crank arm and at least one central axle portion on which the crank arm is mounted. The invention also concerns a method for assembling such an assembly.

In relation to a central axle and to a crank arm of a bicycle transmission, by "coupling" the mutual mechanical interaction is meant between axle and crank arm that makes the two elements integral in rotation about the axis of the bottom bracket assembly, allowing the transmission of torque, i.e., power, between the crank arm and the axle. In the same context, on the other hand, by "attachment" the mutual mechanical interaction is meant that makes the two elements integral in translation in the sense of the axis of the bottom bracket assembly, preventing the crank arm from slipping off, thus ending the coupling.

Hereafter, reference shall be made to an "axle portion," meaning both the entire axle and possibly just the portion thereof with which the crank arm is coupled and fixed; such a portion shall then be associated with another axle portion, with techniques and modes not covered by the present invention, so as to restore the structural integrity of the axle as a whole.

In its most general terms, the present invention concerns, in a first aspect thereof, a bicycle crank arm assembly according to the invention and, in a second aspect thereof, an assembly method according to the invention. Preferred characteristics are further described.

More specifically, according to the first aspect of the invention, the bicycle crank arm assembly comprises at least one axle portion, a crank arm mounted on the at least one axle portion, the crank arm having a coupling seat and the axle portion having a coupling portion coupled to the coupling seat, the coupling seat and the coupling portion being shaped so as to make a shape coupling to ensure that the crank arm can transmit a torque to the axle portion, wherein between the crank arm and the axle portion adhesive material is applied.

The adhesive material preferably has the dual effect of sealing the coupling area and of preventing the relative displacements between the crank arm and the axle portion. Both of these effects contribute to reducing, if not cancelling out, the possibility that corrosion phenomena begin, irrespective of the degree of precision of the shape coupling or the type of attachment system adopted.

Preferably, the coupling seat comprises a shoulder for supporting the axle portion in the axial sense, and possibly the shoulder completely closes the coupling seat in the axial direction. Such a shoulder ensures the correct positioning in the axial sense of the axle portion with respect to the crank arm.

Preferably, the adhesive material is provided between the coupling seat and the coupling portion, and more preferably it completely seals the coupling portion to the coupling seat. It is thus ensured that there is complete protection of the coupling means from external agents such as dirt and humidity, and therefore the creation of corrosion phenomena is countered in the contact areas between the material of the crank arm and the material of the axle portion.

Preferably, the crank arm assembly comprises a gluing chamber formed in at least one of the coupling seat and the coupling portion, the adhesive material being provided in the chamber. The presence of a specific gluing chamber where it is possible to insert a predetermined amount of adhesive material allows a certain barrier against the penetration of external atmospheric agents into the most inner coupling areas to be arranged in a preferred position. Moreover, it allows the gluing conditions, and in particular the adhesion force obtained, to be best controlled in the embodiments in which this is important to prevent the crank arm from slipping off.

Even more preferably, the adhesive material is present both in the gluing chamber, and at least in part of the remaining space between the coupling seat and the coupling portion. In this way polluting agents or humidity are prevented from remaining trapped in the inner-most coupling areas.

The gluing chamber can take up different shapes, just as it may be just one or else there can be many, concentrated in one or more areas or else distributed between the crank arm and the axle portion. The gluing chamber can comprise an annular channel in the crank arm, formed in the coupling seat, and/or an annular channel in the axle portion, formed in the coupling portion. The gluing chamber can also comprise a free space, left free between the coupling seat and the coupling portion by a tapered front area of the coupling portion itself. Such a tapered front area preferably has an axial extension less than or equal to ⅓ the coupling portion; preferably, the tapered front area has an axial extension equal to 2-5 mm.

Preferably, the annular channel is localized in the axial sense in a remote position with respect to the center of the bottom bracket assembly. The effective adhesion is indeed greater in this area, which during use of the bicycle is stressed more and, thus, is more subject to localized deformations that could—if not countered—lead to the attachment being lost.

The adhesive material can be of different types. Preferably, the adhesive material is a setting resin, more preferably a thermosetting resin, such as an epoxy or phenolic resin. In this way it is possible to more easily control both the distribution of the adhesive material when its adhesive properties have not yet been activated, and the final adhesion force.

In a preferred embodiment, the crank arm assembly comprises fastening means to ensure that the coupling means remain engaged with the crank arm and the axle portion, the fastening means comprising the adhesive material.

In this way the shape coupling ensures that the crank arm and the axle portion are integral in rotation, whereas the gluing ensures a predetermined minimum force limit necessary to disassemble the crank arm assembly. The crank arm assembly at the same time has a lower overall weight, a simple assembling process, and a suitable resistance to disassembling. Moreover, the axle portion and the crank arm do not require special processing and the assembling process is simple and cost-effective.

The fastening means also preferably comprise a mechanical forcing of the coupling portion of the axle portion in the coupling seat of the crank arm. The combination of mechanical forcing and adhesive material allows the best attachment conditions to be achieved, i.e., it allows the force necessary to disassemble the crank arm from the axle portion to be determined in the most certain way.

According to the second aspect of the invention, more specifically, the method for assembling a crank arm to an axle portion of a bottom bracket assembly of a bicycle transmission comprises the shape coupling between the crank arm and the axle portion, to ensure that the crank arm can transmit a torque to the axle portion, wherein between the crank arm and the axle portion adhesive material is applied.

Preferably, the adhesive material is applied to one of the crank arm and the axle portion before they are engaged, after which the crank arm and the axle portion are forced in the axial sense. In this way a good distribution of the adhesive material between them is obtained in a simple way.

DETAILED DESCRIPTION

In the figures, a bottom bracket assembly of a bicycle transmission is wholly indicated with 10; just the frame box 11 of the bicycle that supports the bottom bracket assembly 10 is illustrated.

With reference in particular to FIG. 1, the bottom bracket assembly 10 comprises two crank arm assemblies 20 and 40, left and right, each of which comprises a crank arm 21 and 41 and an axle portion 22 and 42, respectively. The two axle portions 22 and 42 are substantially the same as each other and are integral in rotation through a coupling with front teeth 13 and a lock nut 14, only schematically represented since they are per se conventional, so as to form, in use, an axle assembly, globally indicated with 12. It should be noted that in other embodiments (not shown) two different axle portions could be provided, and one of the two portions could even be left out whereas the other could comprise the entire axle.

The right crank arm assembly 40 differs from the left crank arm assembly 20 in that it also comprises—according to widely accepted practice—spokes 47, intended for engagement with crowns, not illustrated. Hereafter, the left crank arm assembly 20 shall be described being understood that what has been stated is also valid for the right crank arm assembly 40.

The axle 12 is rotatably supported in the frame box 11 about a main axis X of the bottom bracket assembly 10, for example, through rolling bearings 15 mounted on adapter supports 16, fixed projecting axially from the frame box 11.

In the left crank arm assembly 20, the crank arm 21 and the axle portion 22 are engaged with each other through coupling means, to allow the transmission of a torque from the crank arm 21 to the axle portion 22, and fastening means to prevent the disengagement of the coupling means.

Figure 3:
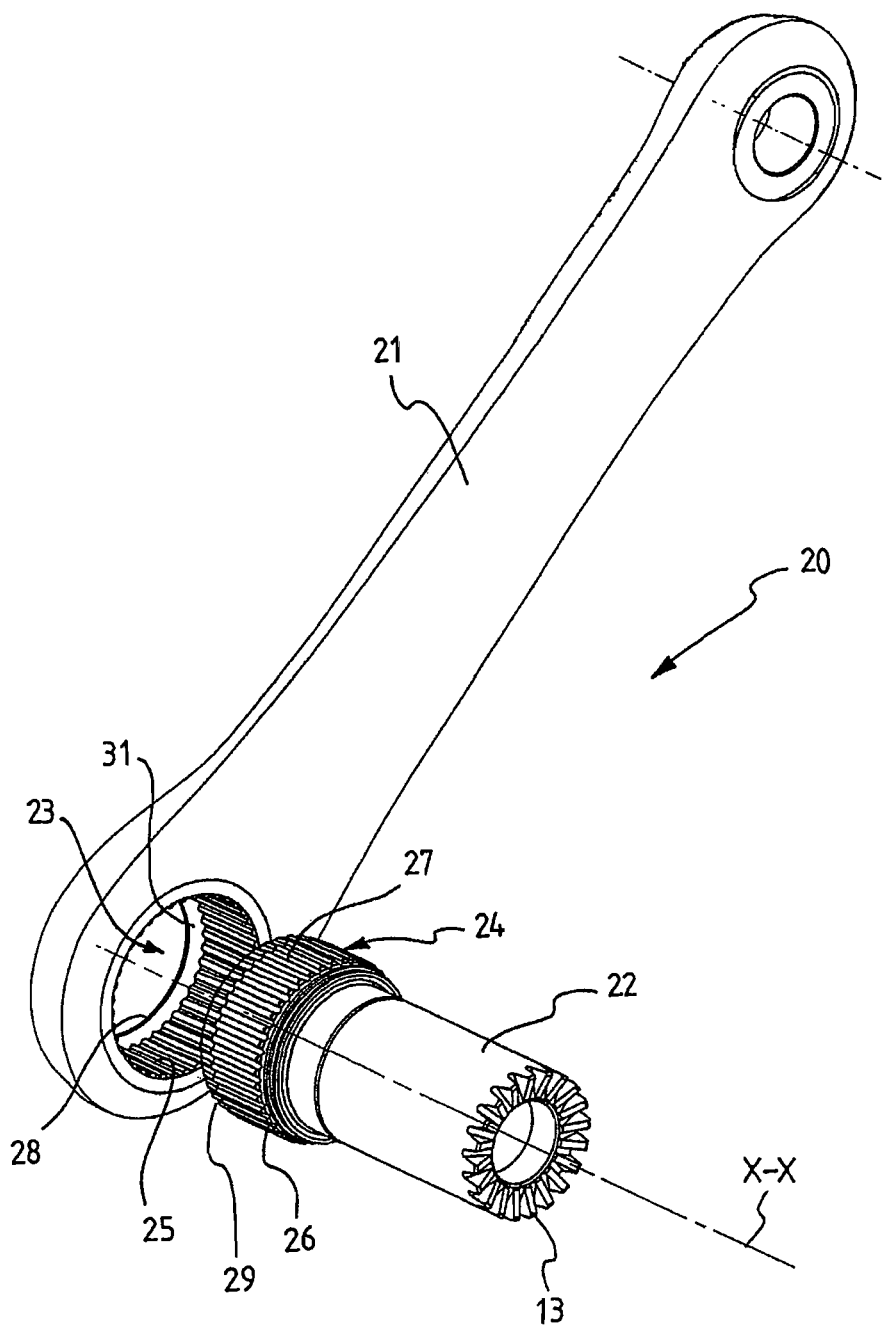
FIG. 3 and FIG. 4 are, respectively, an axonometric view and a section view in the axial sense of the assembly of FIG. 2, represented with separated parts.

The coupling means comprise a coupling seat 23 formed in the crank arm 21 and a coupling portion 24 formed on the axle portion 22 (as represented in FIG. 3); the seat 23 and the portion 24 are shaped so as to make a shape coupling, for example, according to a grooved profile. Such a grooved profile, as shown in detail in FIG. 8, is, for example and preferably, of the type described in co-assigned U.S. application Ser. No. 11/442,848, incorporated herewith by reference, in which a profile 25 in the seat 23 and a matching profile 26 on the axle portion 24 follow a succession of matching waves. In a different embodiment, shown in FIG. 9, a similar grooved profile is provided, with grooved profiles 25' in the seat 23 and 26' on the axle portion 24 that differ from the profiles 25 and 26 in that the crests of the waves both in the seat 23 and in the portion 24 are levelled, so as to leave empty spaces 33' between the two profiles 25' and 26'.

The tolerances of the matching profiles 25 and 26 (or 25' and 26') are such as to make a forced coupling between the crank arm 21 and the axle portion 22.

As can be seen in FIG. 3, as well as in FIGS. 5 to 7, the coupling seat 23 extends in the body of the crank arm 21 axially along the axis X and comprises a shoulder 28 at the end facing in the opposite direction to the center K of the bottom bracket assembly 10. The shoulder 28 can simply project in the radial sense towards the axis X, or else (in a different embodiment, not illustrated) it can extend up to the same axis X, thus completely closing the seat 23. The coupling portion 24 comprises a main portion 27 with generatrices substantially parallel to the axis X and a tapered front area 29 both in the peaks and in the channels of the grooved profile. The front area 29 has the function of an insertion guide portion, and it extends for a length L (represented in FIG. 4) in the sense from the axis X, so as to leave a free space 30 between the coupling seat 23 in the crank arm 21 and the coupling portion 24 of the axle portion 22. The length L is preferably less than or equal to ⅓ the axial extension A of the entire coupling portion 24, and even more preferably is between ⅙ and ⅓ of A, i.e.—in absolute terms—between 2 and 5 mm.

The crank assembly 20 also comprises an annular channel 31, formed in the coupling seat 23 in a position adjacent to the shoulder 28, as can be seen in FIG. 5. In the embodiments of FIGS. 6 and 7, respectively, a channel 31' is formed in the coupling portion 24 opposite the channel 31, and two further channels 31" are formed in the coupling seat 23, axially spaced from the shoulder 28 and from the channel 31.

Figure 4:
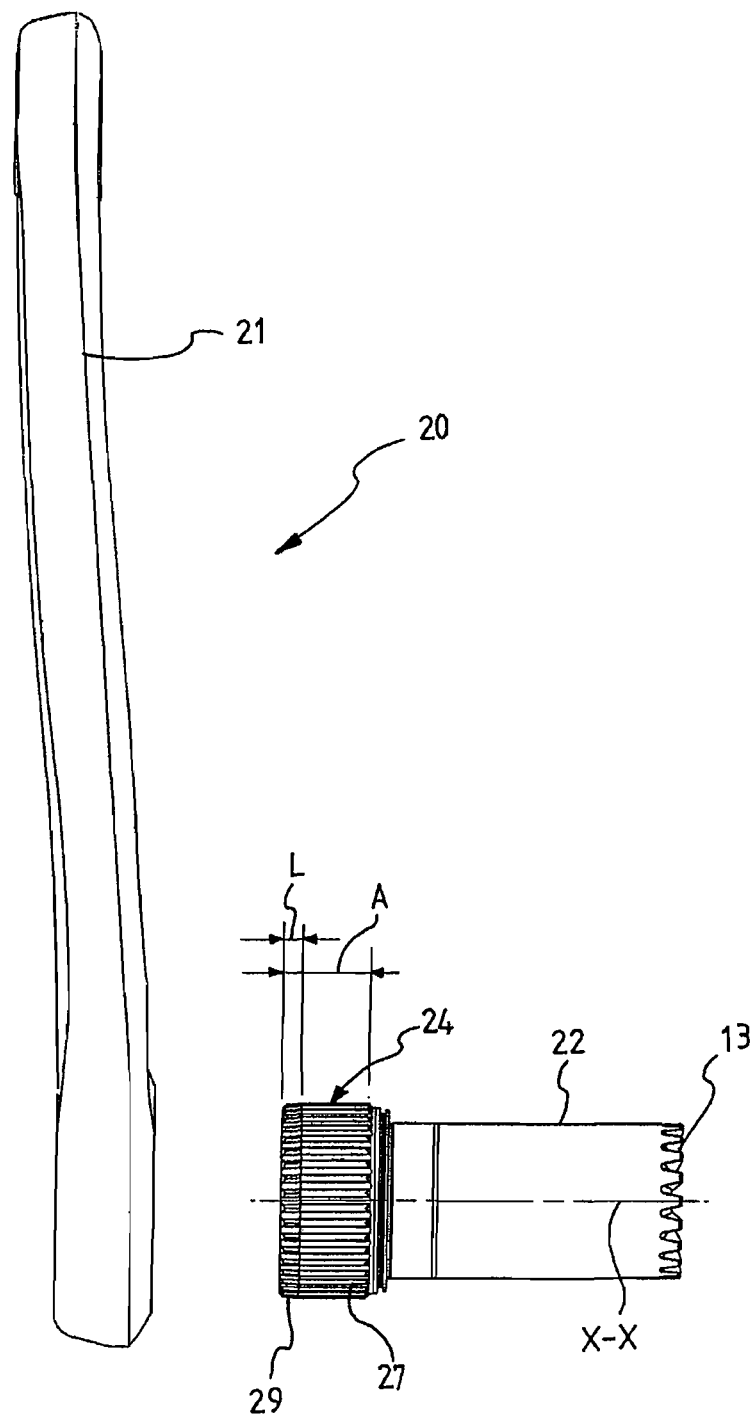

In assembling the crank arm assembly 20, with reference to FIGS. 3 and 4, initially the annular channel 31 of the crank arm 20 is filled with an adhesive material, generically indicated with 50 in the figures. The adhesive material 50 is a setting resin, preferably thermosetting, selected, for example, from an epoxy resin and a phenolic resin, where the former is preferred. According to a first preferred embodiment, the amount of adhesive material 50 applied corresponds exactly to the capacity of the channel 31, so that a single sealing cord is formed inside the latter.

According to a second preferred embodiment, the adhesive material 50 is arranged in the channel 31 in an amount in excess of its capacity.

The front guide area 29 of the axle portion 22 is then inserted into the coupling seat 23 of the crank arm 21, and the axle portion 22 is forced to penetrate into the crank arm 21 applying a suitable insertion force in the axial sense.

The front guide area 29 of the axle portion 22 is made to advance in the coupling seat 23 of the crank arm 21 until it abuts against the shoulder 28. In this step, the adhesive material 50, if placed in excess, is pushed out from the annular channel 31, and—due to the mechanical forcing—penetrates between the grooved profile 25 and the grooved profile 26.

At this point the crank arm assembly 20 is taken into conditions such as to cause the setting of the adhesive 50. In particular, if the adhesive 50 is thermosetting, the crank arm assembly 20 is taken to the setting temperature of the adhesive material itself, and is kept at such a temperature until it is completely solidified. Typical temperature values are between 120° and 180°, for a time of between 10 and 60 minutes.

In the aforementioned way, the adhesive 50 with the channels 31 (and possibly 31', 31") contributes to constituting the fastening means of the crank arm 21 to the axle portion 22.

Between the crank arm 21 and the axle portion 22 a gluing chamber is thus formed from the annular channel 31 and from the free space 30; in the embodiments of FIGS. 6 and 7, the channels 31' and 31" are respectively added. By suitably calibrating the size of the annular channel 31 and of the free space 30 (length L) it is possible to obtain a gluing area that allows the desired extraction force values of the crank arm 21 to be obtained, typically between 30 and 40 kN.

It should be noted that preferably the fastening means of the crank arm 20 and of the axle portion 22 comprise a forced coupling in addition to the adhesive material 50.

It should also be noted that in some crank arm assemblies 20, gaps 51 (purposefully represented substantially enlarged in FIG. 5) can be created between the profile 25 and the profile 26, due to processing defects or embossing due to inaccurate insertion of the axle portion 22. In these assemblies, the small sizes of the gaps and the fluidity of the adhesive material before it has set promote penetration into the gaps 51 by capillarity, making it possible to wet the entire coupling area even from one extreme to the other and thus maximizing protection against corrosion, and the attachment effect of the crank arm.

It should be noted that in the embodiment illustrated in FIG. 6, the channel 31' defines a radially projecting edge 32' that remains enclosed in the adhesive material 50 present in the channels 31 and 31' once set; in this way, in addition to the adhesive effect, there is a mechanical holding effect of the crank arm 21.

The additional channels 31' and 31" are preferably annular.

It should also be noted that in the embodiment of FIG. 7, the channels 31" can be made on both the coupling portion 24 and the coupling seat 23, as well as on both of the elements.

The additional channels 31" can be one or more than one, as illustrated in FIG. 7. The embodiment of FIG. 10 shows a particular additional channel 3'" in the coupling seat 23, which is deeper than the grooves of the grooved profile 25 of the coupling seat 23. Preferably, the additional channel 31'" is closer to the shoulder 28 than to the side wall 60 of the crank arm 21 facing the bicycle's frame box 11. A preferred range of distance T is between 1 and 15 mm. In FIG. 10 the channel 31' is optional.

The additional channel 31'" advantageously performs as a chip breaker during the machine operation to obtain the grooved profile 25 of the coupling seat 23. A preferred machine operation consists of broaching the coupling seat 23 by inserting a tool (not shown) from the side of the side wall 60 and by moving the tool until it reaches the channel 31. Since the coupling seat 23 is closed by the shoulder 28, the tool has a limited stroke, and the additional channel 31'" avoids the chip to remain attached to the crank arm inside the channel 31. This is also useful in case of a completely blind coupling seat.

It should also be noted that the crank arms 21 and 41 are made from metal material, such as aluminium or titanium alloys, and that the axle portions 22 are made from steel or light metal alloys.

What is claimed is:

1. Bicycle axle and crank arm assembly, comprising:
   at least one axle having a portion that is received within a bottom bracket housing, and a coupling portion;
   a crank arm having a coupling seat that is mounted on said coupling portion; a shoulder that abuts an axial end of said axle portion; and, an annular channel adjacent to said shoulder;
   wherein said coupling seat and said coupling portion in a gluing chamber formed in at least one of said coupling seat and said coupling portion, to receive said adhesive material are shaped to make a coupling to ensure that the crank arm transmits torque to the axle portion, and an adhesive material is applied between said coupling seat and said coupling portion.

2. Assembly according to claim 1, wherein the shoulder completely closes the coupling seat in the axial direction.

3. Assembly according to claim 1, wherein the adhesive material completely seals the coupling portion to the coupling seat.

4. Assembly according to claim 1, wherein said adhesive material is present both in said gluing chamber, and at least in part of a remaining space between the coupling seat and the coupling portion.

5. Assembly according to claim 1, wherein said gluing chamber comprises an annular channel in the crank arm, formed in the coupling seat, and/or an annular channel in the axle portion, formed in the coupling portion.

6. Assembly according to claim 5, wherein the annular channel is located in an axial direction in a remote position with respect to a center of the assembly.

7. Assembly according to claim 1, wherein said gluing chamber comprises a free space, left free between the coupling seat and the coupling portion by a tapered front area of the coupling portion itself.

8. Assembly according to claim 1, wherein the adhesive material is a setting resin.

9. Assembly according to claim 8, wherein the setting resin is a thermosetting resin.

10. Assembly according to claim 9, wherein the thermosetting resin is selected from the group consisting of an epoxy and a phenolic resin.

11. Assembly according to claim 1, wherein the adhesive material ensures that the shape coupling remains engaged with the crank arm and the axle portion.

12. Assembly according to claim 11, further comprising a mechanical forcing of the coupling portion of the axle portion in the coupling seat of the crank arm.

13. Method for assembling a crank arm to an axle portion of a bottom bracket assembly of a bicycle transmission, comprising providing the crank arm and the axle portion with mating coupling shapes that ensure that the crank arm transmits torque to the axle portion, inserting the axle portion into a coupling seat of the crank arm until an axial end surface of the axle portion abuts a shoulder on the coupling seat of the crank arm, and applying adhesive material in the coupling seat of the crank arm between the crank arm and the axle portion wherein the adhesive material is applied in a gluing chamber, formed in at least one of the crank arm and the axle portion.

14. Method according to claim 13, wherein the adhesive material is applied to one of the crank arm and the axle portion before they are engaged, after which the crank arm and the axle portion are forced together in an axial direction.

15. Method according to claim 14, wherein the adhesive material is applied in a gluing chamber, formed in at least one of the crank arm and the axle portion.

16. Method according to claim 13, wherein the adhesive material is a setting resin.

17. Method according to claim 16, wherein the setting resin is a thermosetting resin.

18. Method according to claim 17, wherein the thermosetting resin is selected from the group consisting of an epoxy and a phenolic resin.

\* \* \* \* \*